US012316469B2

(12) United States Patent
Diaz et al.

(10) Patent No.: US 12,316,469 B2
(45) Date of Patent: May 27, 2025

(54) SECONDARY CONTROL FOR DE-ENERGIZING SAFETY FIELD DEVICES WITH DIGITAL PROTOCOLS

(71) Applicant: Fisher-Rosemount Systems Inc., Round Rock, TX (US)

(72) Inventors: Sergio Diaz, Round Rock, TX (US); Gary Law, Round Rock, TX (US)

(73) Assignee: Fisher-Rosemount Systems Inc., Round Rock, TX (US)

( * ) Notice: Subject to any disclaimer, the term of this patent is extended or adjusted under 35 U.S.C. 154(b) by 200 days.

(21) Appl. No.: 18/165,739

(22) Filed: Feb. 7, 2023

(65) Prior Publication Data

US 2024/0267241 A1    Aug. 8, 2024

(51) Int. Cl.
*G06F 15/173* (2006.01)
*H04L 12/10* (2006.01)
(52) U.S. Cl.
CPC .................................... *H04L 12/10* (2013.01)
(58) Field of Classification Search
CPC ................................ H04L 12/00; H04L 12/10
See application file for complete search history.

(56) References Cited

U.S. PATENT DOCUMENTS

| | | | | |
|---|---|---|---|---|
| 2004/0268169 | A1* | 12/2004 | Bashford | G06F 1/3203 713/320 |
| 2007/0057783 | A1* | 3/2007 | Reller | G05B 19/042 340/538 |
| 2015/0127876 | A1* | 5/2015 | Erni | G06F 13/4282 710/315 |
| 2017/0083036 | A1* | 3/2017 | Sueki | G05B 19/048 |
| 2020/0217862 | A1* | 7/2020 | Newberg | G01N 35/04 |
| 2021/0081346 | A1 | 3/2021 | Nixon et al. | |
| 2023/0318875 | A1* | 10/2023 | Swarr | G06F 13/4282 370/254 |
| 2024/0056320 | A1* | 2/2024 | Swarr | H04L 12/10 |

OTHER PUBLICATIONS

Product Data Sheet, DeltaV PK Controller, 19 pages, Dec. 2022.
Product Data Sheet, DeltaV Electronic Marshalling with Distributed CHARMs, 20 pages, Jul. 2022.
Product Data Sheet, DeltaV Safety Instrumented System (SIS) with Electronic Marshalling, 52 pages, Sep. 2022.
Product Data Sheet, DeltaV SX Controller, 6 pages, Nov. 2022.
Wikipedia, "Highway Addressable Remote Transducer Protocol", 4 pages, printed May 1, 2023 from https://web.archive.org/web/20220630160019/https://en.wikipedia.org/wiki/Highway_Addressable_Remote_Transducer_Protocol.

* cited by examiner

*Primary Examiner* — Duyen M Doan
(74) *Attorney, Agent, or Firm* — Quarles & Brady LLP

(57) ABSTRACT

A two-wire routing device includes an upstream communication interface for communication with a controller, a two-wire communication and power interface configured to convey communication and power to a field device over a two-wire link, and a router electronic controller. The router electronic controller is coupled to the upstream communication interface and the two-wire communication and power interface. The router electronic controller receives, via the upstream communication interface, a safe state command from the controller, and transmits, via the two-wire communication and power interface, the safe state command to a field device over the two-wire link. The router electronic controller further executes a secondary de-energization scheme for the field device to control a power switch to cut power over the two-wire link to the field device.

20 Claims, 7 Drawing Sheets

SECONDARY CONTROL FOR DE-ENERGIZING SAFETY FIELD DEVICES WITH DIGITAL PROTOCOLS

FIELD OF THE INVENTION

This disclosure relates generally to the control of safety field devices in a safety instrumented system (SIS) or a distributed control system (DCS) using digital communication protocols, and, more specifically, to the de-energization of safety field devices using digital communication protocols.

BACKGROUND

A typical field device control system may interface with several hundred to several thousand field devices such as: transmitters, thermocouples, and switches that provide an indication of various process parameters; solenoids and digital valve controllers that control the operation of valves; lights or other indicators that provide a field indication of process conditions; and other types of process inputs and outputs. These field devices may be spread over very large physical areas, and the majority of the devices communicate with the control system via wires that form individual circuits between the control system and each field device (such as a pair of wires that convey an analog signal via the current flowing on the circuit, an open or closed circuit that indicates the status of a process parameter or causes a process control device to be in a particular state, etc.). In typical control systems, the wires that connect the hundreds or thousands of field devices to the control system are routed through a series of field wiring, junction boxes, and homerun cables to various marshalling locations (e.g., marshalling cabinets) at which the wires that are coupled to individual field devices are "marshalled" so that they may be connected to an I/O interface of the control system.

SUMMARY

A two-wire routing device that includes an upstream communication interface for communication with a controller; a two-wire communication and power interface configured to convey communication and power to a field device over a two-wire link; and a router electronic controller. The router electronic controller is coupled to the upstream communication interface and the two-wire communication and power interface. The router electronic controller is configured to: receive, via the upstream communication interface, a safe state command from the controller, the safe state command including a field device identifier; transmit, via the two-wire communication and power interface, the safe state command to a field device indicated by the field device identifier as a digital signal over the two-wire link; and execute a secondary de-energization scheme for the field device, subsequent to transmitting the safe state command to the field device, to control a power switch to cut power over the two-wire link to the field device.

The router electronic controller may include a network switch that is configured to determine, from the safe state command, the field device identifier to identify the field device indicated by the field device identifier. To transmit, by the router electronic controller, the safe state command via the two-wire communication and power interface, the network switch may further be configured to translate the safe state command from a first protocol to a two-wire digital protocol and to drive the two-wire communication and power interface, according to the two-wire digital protocol, to convey the safe state command to the field device. The safe state command received by the upstream communication interface may be received by the router electronic controller as a packetized communication in the first protocol, the packetized communication including the safe state command as one or more data payload packets and a packet header including an address as the field device identifier. The two-wire routing device may be a modular two-wire routing device mounted in a multi-module backplane, where the multi-module backplane includes: a plurality of module bays, each module bay configured to receive a respective field device characterization module; a backplane microcontroller communicatively coupled to the controller and to each field device characterization module received in the plurality of module bays, and configured to route messages between the controller and each field device characterization module received in the plurality of module bays; a communication bus coupling the backplane microcontroller and each module bay to enable communications between the backplane microcontroller and each field device characterization module received in the plurality of module bays; and a power supply configured to supply power to each field device characterization module received in the plurality of module bays. The modular two-wire routing device may be a field device characterization module that is mounted in a first module bay of the plurality of module bays, is communicatively coupled to the backplane microcontroller, and is powered by the power supply. The upstream communication interface may be coupled to the backplane microcontroller via the communication bus to enable communication with the backplane microcontroller, and the safe state command received from the controller by the router electronic controller may be received via the backplane microcontroller over the communication bus. The router electronic controller may be further configured to determine to execute the secondary de-energization scheme in response to receipt of a command from the controller to initiate the secondary de-energization scheme, the command being addressed to the two-wire routing device. The router electronic controller may be further configured to determine to execute the secondary de-energization scheme in response determining that a watchdog timer has elapsed. The field device may be a first field device of a plurality of field devices coupled to the two-wire routing device, wherein, to execute the secondary de-energization scheme in response to determining that the watchdog timer has elapsed, the router electronic controller may be configured to: cut power to each output field device of the plurality of field devices, including the first field device, and permit power to continue to flow to each non-output field device of the plurality of field devices. The field device may be a first field device of a plurality of field devices coupled to the two-wire routing device, each field device of the plurality of field devices being coupled to the two-wire communication and power interface via a respective two-wire link and corresponding power switch along the two-wire link, wherein the router electronic controller may be further configured to selectively control each corresponding power switch to selectively enable and disable power to plurality of field devices. The device may further include a housing that houses the router electronic controller and the power switch. The device may further include a housing that houses the router electronic controller, wherein the power switch is external to the housing. The two-wire link may include a twisted pair of conductors extending through a shielding conduit.

A method for causing a field device to enter a safe state. The method includes receiving, by a two-wire routing device via an upstream communication interface, a safe state command from a controller. The safe state command includes a field device identifier. The method further includes transmitting, by the two-wire routing device, the safe state command to a field device indicated by the field device identifier as a digital signal via a two-wire communication and power interface over a two-wire link that also provides power to the field device. The method further includes executing, by the two-wire routing device, a secondary de-energization scheme for the field device subsequent to transmitting the safe state command to the field device. The secondary de-energization scheme includes controlling, by the two-wire routing device, a power switch to cut power over the two-wire link to the field device.

The method may additionally include determining, by a router electronic controller of the two-wire routing device, the field device identifier from the safe state command to identify the field device indicated by the field device identifier; and the transmitting, by the router electronic controller, the safe state command via the two-wire communication and power interface may include: translating the safe state command from a first protocol to a two-wire digital protocol, and driving the two-wire communication and power interface, according to the two-wire digital protocol, to convey the safe state command to the field device. The safe state command received by the two-wire routing device may be a packetized communication in a first protocol, the packetized communication including the safe state command as one or more data payload packets and a packet header including an address as the field device identifier. The two-wire routing device may be a modular two-wire routing device mounted in a multi-module backplane, and the method may additionally include receiving, by each module bay of a plurality of module bays of the multi-module backplane, a respective field device characterization module; routing messages, by a backplane microcontroller communicatively coupled to the controller and to each field device characterization module received in the plurality of module bays, between the controller and each field device characterization module received in the plurality of module bays; conveying, by a communication bus coupling the backplane microcontroller and each module bay, communications between the backplane microcontroller and each field device characterization module received in the plurality of module bays; and supplying power, by a power supply, to each field device characterization module received in the plurality of module bays, wherein the modular two-wire routing device may be a first field device characterization module of the field device characterization modules that is mounted in a first module bay of the plurality of module bays, is communicatively coupled to the backplane microcontroller, and is powered by the power supply. The upstream communication interface of the two-wire routing device may be coupled to the backplane microcontroller via the communication bus to enable communication with the backplane microcontroller, and the safe state command received from the controller by the two-wire routing device may be received via the backplane microcontroller over the communication bus. The determining, by the two-wire routing device, to execute the secondary de-energization scheme may be in response to receipt of a command from the controller to initiate the secondary de-energization scheme, the command being addressed to the two-wire routing device. The determining, by the two-wire routing device, to execute the secondary de-energization scheme may be in response determining that a watchdog timer has elapsed. The field device may be a first field device of a plurality of field devices coupled to the two-wire routing device, and the executing the secondary de-energization scheme in response to determining that the watchdog timer has elapsed further may further include cutting power to each output field device of the plurality of field devices, including the first field device, and permitting power to continue to flow to each non-output field device of the plurality of field devices.

DETAILED DESCRIPTION OF THE INVENTION

A field device control system, for example, a safety instrumented system (SIS) or a distributed control system (DCS system), may control one or more processes of an industrial plant. Such control systems may, from time to time, determine a fault or safety condition is present in the system and control the one or more field devices to a safe state. Many analog systems include a method to de-energize the field device to ensure the process is taken to a safe state. For example, a control system may include an analog communication link with each field device in the form of an analog control signal (e.g., between 4-20 mA) to control each respective field device. The field device will control a component thereof (e.g., a valve position) based on the amperage of the analog control signal. The field device may have both a controllable safe state and a default safe state when the analog control signal is disconnected. The controllable safe state may result from, for example, a 4 mA signal at an input of the field device that controls a controllable component of the field device (e.g., a valve) to a safe state (e.g., fully closed, fully opened, etc.). The default (de-energized) safe state may result when the analog control signal is disconnected (e.g., resulting in 0 mA at an input of the field device), in which case, the field device reverts to the safe state (e.g., a valve position fully closed, fully opened, etc.).

More recently, fully digital systems have been introduced in which field devices communicate with the control system using only digital communications (e.g., HART-IP communication protocol). In such systems, an analog communication link is no longer present between the field devices and the control system. Accordingly, a secondary or backup technique for placing a field device in a safe state may not be present. Thus, when a digital communication to control a field device to a safe state fails to result in that field device entering a safe state, the field device may continue to operate in contrast to the request to enter the safe state.

Embodiments described herein address one or more of these and other challenges to provide systems and methods having secondary de-energization capabilities for field devices that communicate using fully digital protocols.

Figure 1:
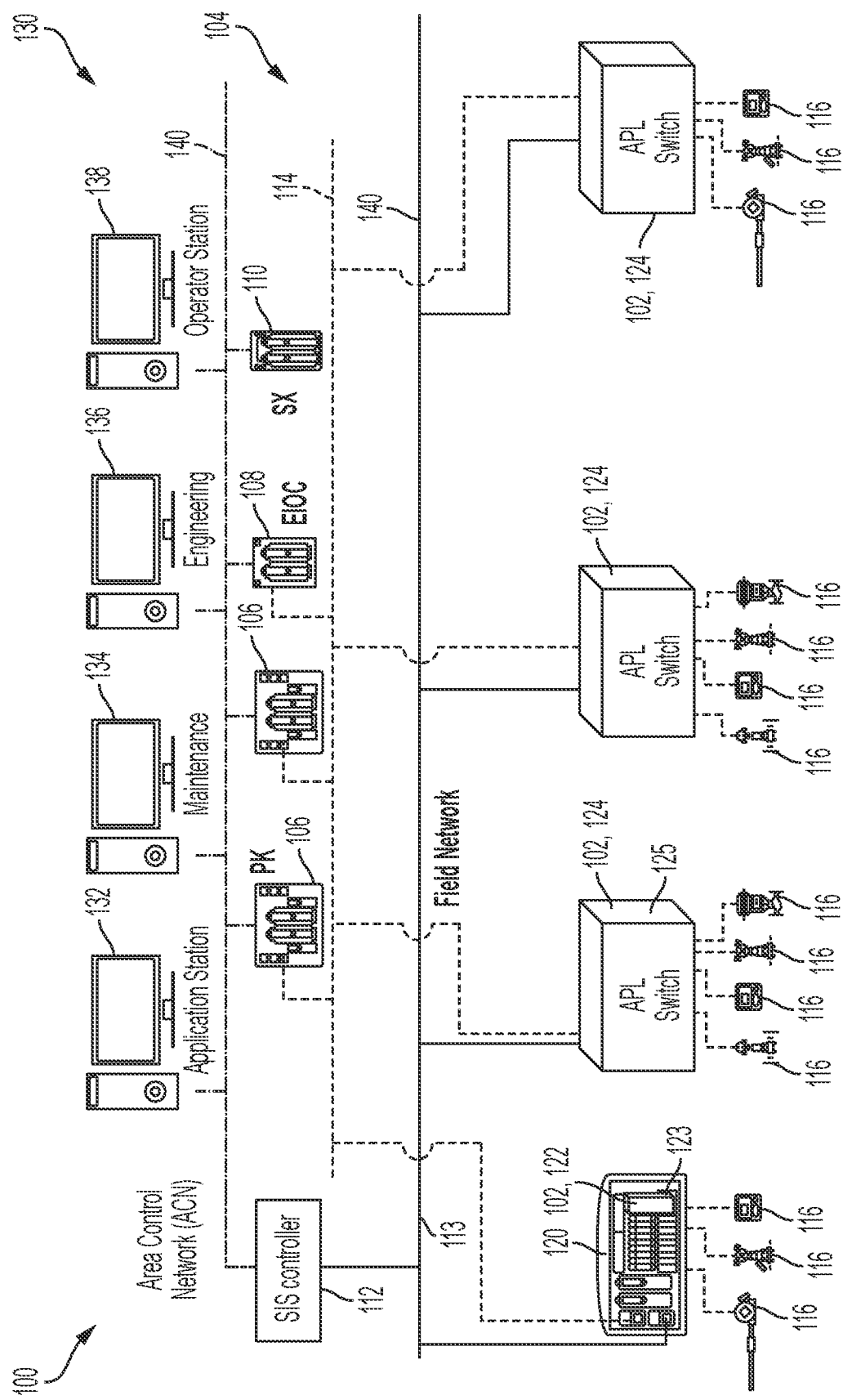
FIG. 1 is a diagram that illustrates various components of a control system in accordance with an aspect of this disclosure.

FIG. 1 illustrates a control system 100 that includes one or more advanced physical layer (APL) routing devices 102 according to teachings of this disclosure. The control system 100 further includes a field network 104 including network controllers, such as a Delta V™ PK Controller 106, Ethernet I/O Card (EIOC) 108, DeltaV™ SX Controller 110, safety instruments system (SIS) controller 112, or the like, one or more communication buses 113, 114, one or more field devices 116, and one or more intermediary network devices, such as backplane 120, modular APL switch 122, APL switch 124, or the like. The network controllers (e.g., the network controllers 106, 108, 110, 112) are communicatively coupled to the one or more field devices 116 via the one or more communication buses 113, 114 and the one or more intermediary network devices. The intermediary network device to which the field devices 116 are directly coupled (e.g., the modular APL switch 122 and the APL switch 124) may be referred to as input/output interfaces for the control system 100. In some examples, a first subset of the control system 100, including the SIS controller 112, APL routing devices 102, field devices 116, and communication bus 113 may be referred to as a safety instrumented system (SIS system), and a second subset of the control system 100, including one or more of the network controllers 106, 108, 110, the intermediary network devices, the field devices 116, and the communication bus 114 may be referred to as a distributed control system (DCS system) or basic process control system (BPCS system). In some examples, the communication buses 113 and 114 are isolated from one another. In some examples, the communication buses 113 and 114, or portions thereof, are integrated into a shared communication bus shared among one or more of the components of the SIS system and the DCS system.

The control system 100 further includes an area control network (ACN) 130 that includes back-end computing devices providing monitoring, maintenance, engineering, and operational control functions for the devices of the field network 104. For example, the back-end computing devices may include one or more application stations 132, maintenance stations 134, engineering stations 136, and operator stations 138. Each back-end computing device may include one or more computing devices (e.g., laptop computers, desktop computers, tablet computers, mobile phones, etc.) that, for example, execute local software and/or access cloud-based services to provide the noted functionality. The back-end computing devices are coupled by an ACN bus 140 to the network controllers (e.g., network controllers 106, 108, 110, 112). In some examples, the back-end computing devices are used to program network controllers (e.g., to set parameters, operation schedules, or the like for field devices under control or supervision of the network controllers), retrieve information from the network controllers (e.g., data logs, program schedules, parameter settings, etc. for the field devices or network controllers), to control or schedule maintenance performed on or by the network controllers, or the like.

The field devices 116 may take a variety of forms and perform a variety of functions. For example, field devices 116 may include transmitters, thermocouples, and switches that provide an indication of various process parameters; solenoids and digital valve controllers (DVCs) that control the operation of valves; lights or other indicators that provide a field indication of process conditions; and other types of process input devices and output devices. The field devices 116 may each be classified as an output field device, an input field device, or an indicator field device. Output field devices are field devices operable to control an output of a system process of the control system 100. For example, output field devices may include motors, valves, solenoids, or other actuatable elements configured to stop, start, or adjust the flow of a material, fluid, or gas; adjust the position of a movable component (e.g., open or close a door, rotate a gear or drive shaft, etc.); control a heating or cooling element; enable or disable power to a component; or the like. Input field devices are field devices that obtain a process parameter to the control system 100 (e.g., via a sensor) and provide an indication of the process parameter to the control system 100 (e.g., for use to determine how to control an output field device). An indicator field device is a field device configured to provide an indication of a process condition of the control system 100 in the field (e.g., via a light, speaker, or other controllable indicator of the indicator field device). Some field devices 116 may perform more than one of controlling a process output, providing a process input, and providing an indication of a process condition of the control system 100. In such cases, the field devices be considered, for example, an output field device, an input field device, and an indicator field device. Additionally, a non-output field device may be a field device that is not classified as an output field device, such as a field device that is classified as an input field device and/or an indicator field device and that does not directly control a process output.

As noted above, the control system 100 includes one or more APL routing devices 102, also referred to as APL routers or APL switches. Generally, an APL routing device 102 is configured to route messages between field devices 116 coupled to the APL routing device 102 and upstream devices, such as the SIS controller 112 and/or another of the network controllers. This routing may include one or more of receiving a message, identifying an intended recipient of the message, translating the message to a communication protocol used by and suitable for the recipient, and transmitting the translated message. Further, the APL routing devices 102 are configured to communicate using a two-wire digital protocol that uses a two-wire link between devices that conveys both power and communication signals, such as Ethernet Advanced Physical Layer (referred to herein as Ethernet-APL or APL). Ethernet-APL is a physical layer for Ethernet-based communications that enables communications at high speeds and over long distances. Ethernet-APL uses a two-wire link between communicating devices that conveys a supply of power (to one or more of the communicating devices) and communication signals. The two-wire link includes a single, twisted-pair (2-wire) cable that may extend through an outer shielding. Ethernet-APL is a subset of the Ethernet standard particularly designed for providing communications in industrial settings to and from field devices that may be distributed across great distances, may rely on high-speed communications, and may be located in explosion hazardous areas. Although multiple devices are described as APL devices herein, and such devices may use Ethernet-APL for communications, in some examples, these devices may implement another two-wire digital protocol that includes power and communication transmission. Accordingly, the APL routing device 102 may also be referred to as a two-wire routing device or a two-wire power and digital communication routing device, which may be configured to communicate and provide power according to Ethernet-APL and/or another two-wire digital protocol that includes power and communication transmission.

Two types of such APL routing devices 102 are illustrated in FIG. 1, the modular APL switch 122 and the APL switch 124. The modular APL switch 122 is received in a module bay of the backplane 120. As described in further detail below (e.g., with respect to FIG. 5), the backplane 120 may include a plurality of module bays, each configured to receive a respective field device characterization module, such as the modular APL switch 122. The backplane 120 may further include a housing or chassis supporting the module bays, a microcontroller to route messages between upstream devices and the field device characterization modules, an interconnecting communication bus (or busses) to interconnect the microcontroller and field device characterization modules, and a power supply to power the microcontroller and field device characterization modules. The modular APL switch 122 further includes a housing 123 supporting the components of the modular APL switch 122.

The APL switch 124 may be a stand-alone unit, physically and functionally, for example, with a housing 125 that includes or couples to an independent power supply and does not mount to a backplane configured to receive a plurality of modular APL switches or other routing devices. In other examples, the APL switch 124 is a stand-alone unit, functionally, but is mounted within a chassis along with other routing devices and hardware. In such examples, the APL switch 124 may or may not include the housing 125. In some examples, an APL switch 124 is configured to interface with more than one field device 116, while a modular APL switch 122 is configured to interface with a single field device 116. In other examples, an APL switch 124 is configured to interface with a single field device 116, and/or a modular APL switch 122 is configured to interface with more than one field device 116.

The SIS controller 112, also referred to as a logic solver, may be a controller of a safety instrumented system (SIS) of the control system 100. Accordingly, the SIS controller 112 may receive and analyze system data (e.g., from field devices 116, from intermediary network devices (e.g., the modular APL switch 122 or the APL switches 124), and from other network controllers) and determine whether a safety condition is present. In response to determining that a safety condition is present, the SIS controller 112 may control the control system 100 to cease certain processes or functions, which may include controlling field devices 116 to a de-energized state. To analyze the system data to determine whether a safety condition is present, the SIS controller 112 may compare the parameters indicated by the system data to one or more thresholds defining operation ranges for the respective parameters. When the SIS controller 112 determines that a parameter or parameters is/are outside of the defined operation ranges, the SIS controller 112 may determine a safety condition is present. The SIS controller 112 may also determine a safety condition is present based on receipt of a direct or binary indication from another device in the control system 100 that the safety condition is present.

The SIS controller 112, like the other network controllers, may include a memory storing software and an electronic processor configured to retrieve and execute the software to implement the functionality of the SIS controller 112 described herein. The memory can include read-only memory (ROM), random access memory (RAM), other non-transitory computer-readable media, or a combination thereof. The electronic processor can include one or more processors, field programmable gate arrays (FPGAs), application specific integrated circuits (ASICs), or other processing circuitry operating alone or in combination with one another to implement the functionality of the SIS controller 112 described herein. In some examples, the SIS controller 112 includes redundant components (e.g., a redundant electronic processor and memory that mirrors the (primary) electronic processor and memory already described) to provide backup functionality in the event of an error or failure of the primary components.

The other network controllers, such as the network controller 106, may implement a system process for the control system 100. For example, the network controllers may have process control logic defined in a memory of the network controller that is executed by the electronic processor of the network controller. Through execution of the process control logic, the network controller 106 may receive system data (e.g., from field devices 116) indicating system parameters of the control system 100, process the system data (e.g., according to settings, thresholds, and the like defined in the memory), and generate and transmit operation controls to the field devices 116 to control the field devices 116 to thereby implement the system process.

Figure 2:
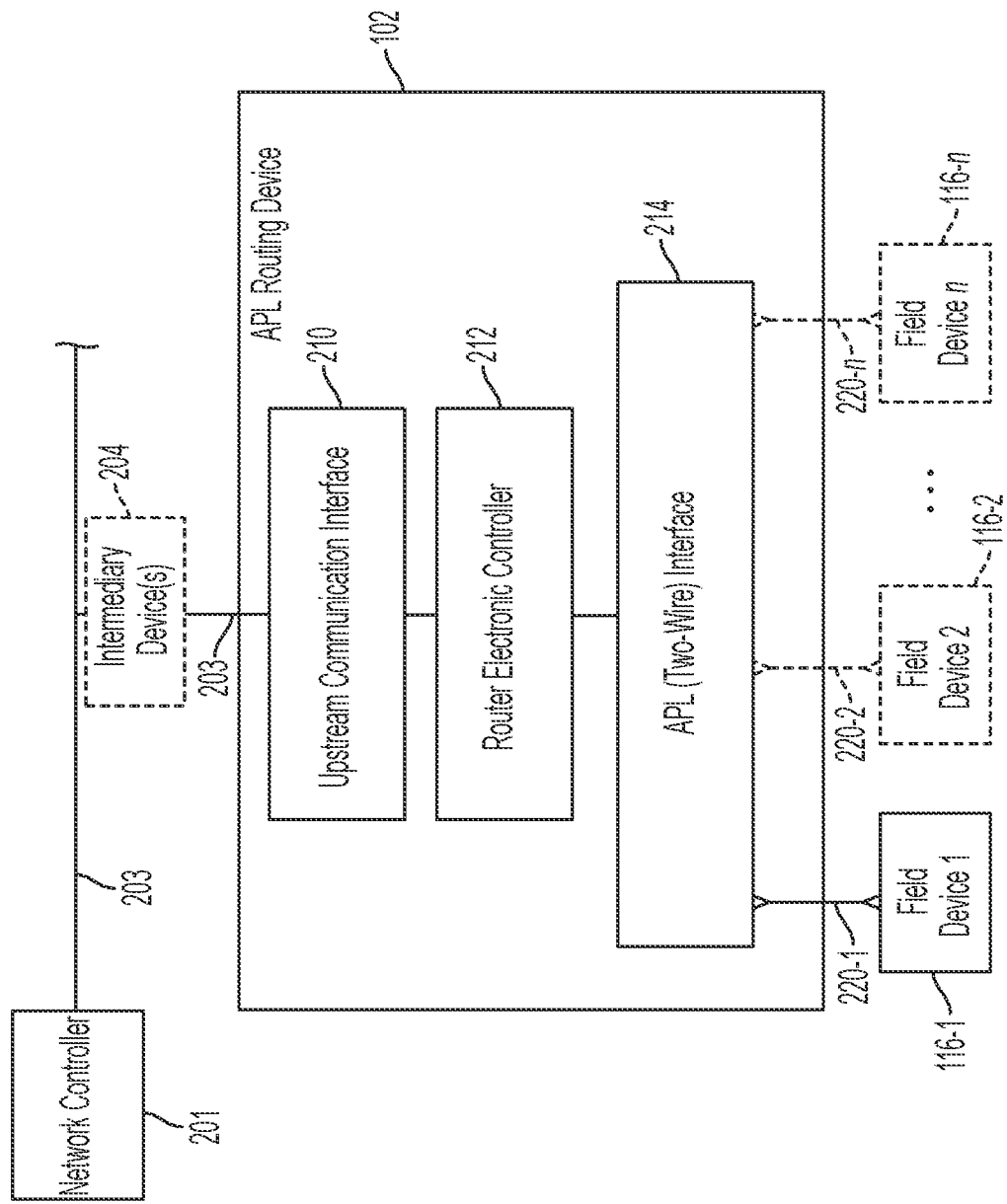
FIG. 2 is a diagram an advanced physical layer (APL) routing device of the control system of FIG. 1 in accordance with an aspect of this disclosure.

FIG. 2 illustrates an APL routing device 102, also referred to as a two-wire routing device, of a control system (e.g., control system 100 of FIG. 1) in further detail, according to some examples. The APL routing device 102 of FIG. 2 is a block diagram applicable to individual examples of both the APL switch 124 and the modular APL switch 122 of FIG. 1. As shown in FIG. 2, the APL routing device 102 may be coupled upstream to a network controller 201 via a communication bus 203. The network controller 201 may be, for example, an SIS controller (e.g., similar to SIS controller 112), a DCS controller (e.g., similar to one of controllers 106, 108, or 110 of FIG. 1), or another type of network controller. The communication bus 203 may be, for example, a communication bus similar to communication bus 113 or communication bus 114. In some examples, one or more intermediary devices 204 are provided between (logically and/or physically) the APL routing device 102 and the network controller 201 along communication bus 203. The intermediary devices 204 may include, for example, one or more microcontrollers of a backplane (e.g., of the backplane 120), gateway devices, additional routing devices, and the like. Like shown in FIG. 1, in FIG. 2, the APL routing device 102 is further coupled to one or more (n) field devices 116 (where n≥1), individually labeled as field devices 116-1, 116-2, through 116-n.

The APL routing device 102 includes an upstream communication interface 210, a router electronic controller 212, and an APL interface 214, also referred to as a two-wire communication and power interface or a two-wire interface. The upstream communication interface 210 includes the physical circuitry (e.g., ports, antennas, filters, drivers, transceivers, and the like) that couples the APL routing device 102 to the communication bus 203. The upstream communication interface 210 enables the router electronic controller 212 to couple to the communication bus 203 and communicate with upstream devices. Accordingly, the upstream communication interface 210 communicatively couples the router electronic controller 212 (and, thereby, the APL routing device 102) to the network controller 201 and other upstream devices in the control system 100.

The APL interface 214 includes the physical circuitry (e.g., ports, antennas, filters, drivers, transceivers, and the like) that couples the APL routing device 102 to two-wire links 220-1 to 220-*n* for communication with the field devices 116. The APL interface 214 enables the router electronic controller 212 to couple to the one or more field devices 116 via the respective two-wire links 220-1 to 220-*n*. Accordingly, the APL interface 214 communicatively couples the router electronic controller 212 (and, thereby, the APL routing device 102) to the one or more field devices 116. An example of the APL interface 214 is described further below with respect to FIG. 4.

The router electronic controller 212, via the interfaces 210 and 214, is configured to route messages between the one or more field devices 116 coupled to the APL routing device 102 and upstream devices, such as the network controller 201 and/or another of the network controllers. This routing may include one or more of receiving a message, identifying an intended recipient of the message, translating the message to a communication protocol used by and suitable for the recipient, and transmitting the translated message.

Figure 3:
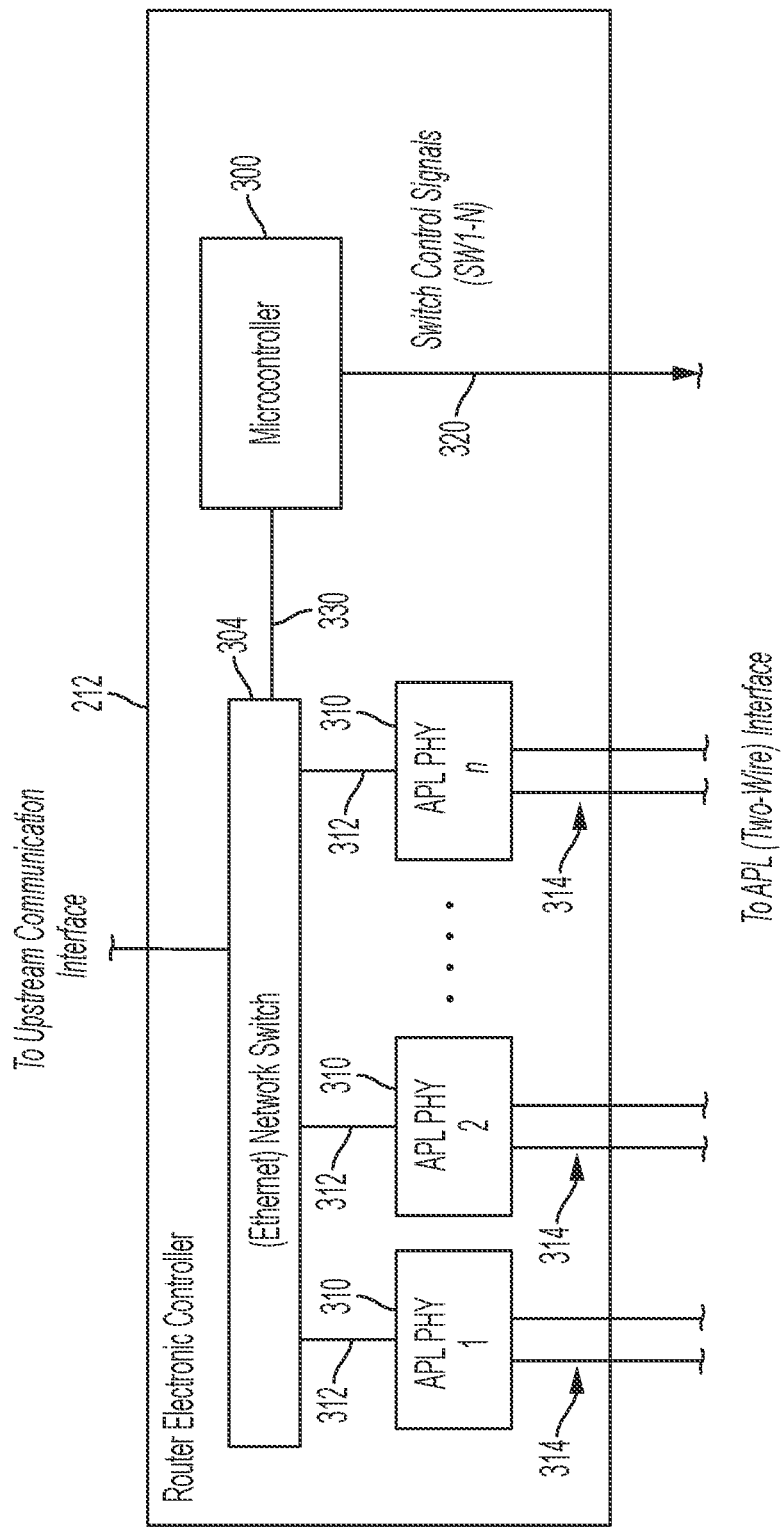
FIG. 3 is a diagram of a router electronic controller of the APL routing device of FIG. 2 in accordance with an aspect of this disclosure.

FIG. 3 illustrates an example of the router electronic controller 212 in further detail. As illustrated, the router electronic controller 212 includes a microcontroller 300, a network switch 304, and one or more (n) APL physical interfaces 310 (also referred to as two-wire physical interfaces 310). Each of the n APL physical interface 310 may be associated with a respective one of the n field devices 116 and, more particularly, coupled to a respective one of the n field devices 116 via APL interface 214 and a respective one of the n two-wire links 220.

In some examples, the microcontroller 300 includes an electronic processor and a memory storing instructions retrieved and executed by the electronic processor to perform the functions of the microcontroller 300 described herein. The memory can include read-only memory (ROM), random access memory (RAM), other non-transitory computer-readable media, or a combination thereof. The electronic processor can include one or more processors, field programmable gate arrays (FPGAs), application specific integrated circuits (ASICs), or other processing circuitry operating alone or in combination with one another to implement the functionality of the microcontroller 300 described herein. The microcontroller 300 is configured to communicate with one or more of the network controllers of the control system 100, including the network controller 201. More specifically, the microcontroller 300 may be associated with a unique address such that the network controller 201 may send messages to the microcontroller 300 (and, thus, to the router electronic controller 212 and APL routing device 102) and receive messages therefrom.

The microcontroller 300 may also be configured to generate switch control signals 320 for controlling power switches associated with the two-wire links 220 of the field devices 116. As illustrated, the switch control signals 320 are provided to the APL interface 214, which is illustrated in further detail with respect to FIG. 4. The switch control signals 320 may include one control signal for each power switch. The switch control signals 320 may be provided over one or more control wires (e.g., one per power switch) that connect the microcontroller 300 to each respective power switch. As described in further detail below, using the switch control signals 320, the microcontroller 300 is configured to selectively de-energize the field devices 116, which provides the network controller 201 (and the control system 100) a secondary technique for de-energizing the field devices 116.

The network switch 304 is configured to route messages between upstream and downstream devices in the control system 100, and between the router electronic controller 212 and upstream and downstream devices in the control system 100. For example, the network switch 304 may be an Ethernet network switch configured to receive communications via the upstream communication interface 210 sent according to an Ethernet communication protocol (e.g., as defined by a standard under the Institute of Electrical Electronics Engineers (IEEE) 802, such as IEEE 802.3 or 802.11) from an upstream device, such as the network controller 201, the network controller 106, the network controller 108, or the network controller 110. The network switch 304 may parse each communication, which may include a series of data packets including a header and payload data packets, to identify an intended recipient from an address or identifier in the header. The network switch 304 may then route the communication to the intended recipient (e.g., to one of the field devices 116 or to the microcontroller 300 representing the APL routing device 102). To route a communication to the microcontroller 300, the network switch 304 may transmit the communication over bus 330 to the microcontroller 300. The network switch 304 may transmit the communication over bus 330 in the same format as the format in which the communication was received. The microcontroller 300 may then parse the communication, recognize that the communication is intended for the microcontroller 300 based on the address or identifier in the header, and then process the payload. To route a communication to one of the field devices 116, then microcontroller 300 may transmit, over a bus 312, the communication to the APL physical interface 310 associated with (and coupled to) the field device 116 that is the intended recipient of the message. The APL physical interface 310 may then translate the packetized communication from the Ethernet protocol to the digital two-wire protocol (e.g., APL protocol) and transmit the communication over a two-wire connector 314 to the APL interface 214. For ease of description, the two-wire connector 314 will be referred to as the internal connector 314, although this naming should not be construed as requiring that the two-wire connector 314 be entirely internal unless otherwise stated. As described further with respect to FIG. 4, the APL interface 214 couples the internal connector 314 to one of the two-wire links 220 and, ultimately, to one of the field devices 116, which is intended to receive the communication.

The network switch 304 is further configured to receive communications from the microcontroller 300 and the field devices 116 and to route the communications appropriately, e.g., to the network controller 201 or other upstream devices. For example, the network switch 304 may parse each communication, which may include a series of data packets including a header and payload data packets, to identify an intended recipient from an address or identifier in the header. The network switch 304 may then route the communication to the intended recipient (e.g., to one of the SIS controller 112, network controller 106, network controller 108, network controller 110, etc.). To route a communication from the microcontroller 300, the network switch 304 may receive the communication over bus 330 from the microcontroller 300. The network switch 304 may transmit the communication via upstream communication interface 210 over bus 203 in the same format as the format in which the communication was received. A communication from one of the field devices 116 may first be received by the APL physical interface 310 associated with (and coupled to) the field device 116 that is transmitting the message. The APL physical interface 310 may then translate the communication from the digital two-wire protocol (e.g., APL protocol) to the Ethernet protocol and provide the communication over bus 312 to the network switch 304. At least in some examples, the translations of communications to and from the digital two-wire protocol (e.g., to/from the APL protocol) may use standard network translation techniques. The network switch 304 may then route the communication to the intended recipient (e.g., to one of the SIS controller 112, network controller 106, network controller 108, network controller 110, etc.).

In some examples, the APL routing device 102 is coupled to an upstream device or devices via another two-wire link and is configured to communicate using the APL protocol upstream (i.e., in addition to communicating using the APL protocol downstream). In such examples, an additional APL physical interface 310 may be provided between the network switch 304 and the upstream communication interface 210 to translate communications to and from the APL protocol.

Although the microcontroller 300, network switch 304, and APL physical interfaces 310 are illustrated as separate components, in some examples, one or more of these components are integrated into a single device. For example, a shared electronic processor and memory may serve as (i.e., perform the functions of) the electronic processor and memory of both the network switch 304 and the microcontroller 300, of both the network switch 304 and APL physical interfaces 310, or of the network switch 304, the microcontroller 300, and the APL physical interfaces 310.

Figure 4:
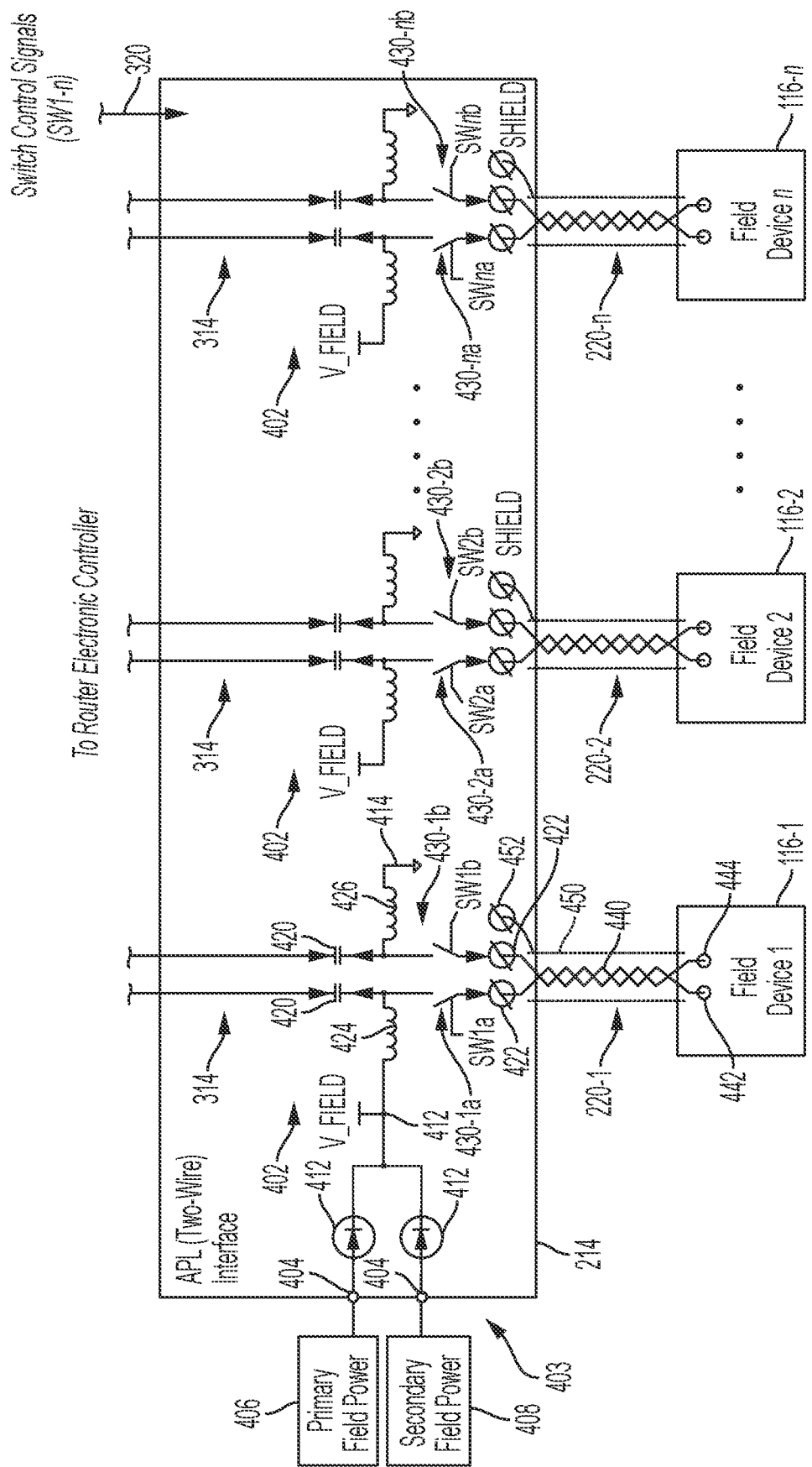
FIG. 4 is a diagram of an APL interface of the APL routing device of FIG. 2 in accordance with an aspect of this disclosure.

FIG. 4 illustrates an example of the APL interface 214 in further detail. As illustrated, the APL interface 214 includes the other ends of the internal connectors 314 from the router electronic controller 212, and receives the switch control signals 320 from the router electronic controller 212 along switch control lines. The APL interface 214 includes one or more (n) sub-two-wire interfaces 402 (herein, sub-interfaces 402), each providing a separate connection or interface point for a respective field device of the field devices 116. Although the APL interface 214 is illustrated with (n) sub-interfaces 402 coupled to n two-wire links 220 and n field devices 116, in some examples, the APL interface 214 has more sub-interfaces 402 than field devices 116 (e.g., m sub-interfaces 402, where m>n), meaning that some (i.e., m-n) of the sub-interfaces 402 are open or unused and available to couple to further field devices 116. In other words, even if an APL interface 214 is operable to independently couple to 10 fields devices (e.g., has 10 sub-interfaces 402), the APL interface 214 may be coupled to only 1, 2, 5, or another number of field devices that is less than the total capacity of the APL interface 214. For ease of discussion, however, the description will generally refer to a system having n sub-interfaces 402, two-wire links 220, and field devices 116.

The APL interface 214 further includes a power supply 403 including connections 404 for coupling to a primary field power 406 and a secondary field power 408. The secondary field power 408 may be a redundant power source providing a backup supply of power in the event of an interruption to the primary field power 406. Both the primary and second field powers 406, 408 may provide a DC supply of power to the APL routing device 102 via the connections 404. Each connection 404 is coupled to a power supply node 410 via a respective diode 412. Each diode 412 prevents a reverse flow of power (e.g., from the primary field power 406 to the secondary field power 408, and vice versa).

Each sub-interface 402 is coupled to the power supply node 410, ground 414, the internal connectors 314, and one of the two-wire links 220 (e.g., two-wire link 220-1). For example, with reference to the sub-interface 402 for the field device 116-1, the internal connectors 314 are connected to respective capacitors 420, which are connected to respective ports 422, which are conceited to the two-wire link 220-1. Additionally, the power supply node 410 is coupled via an inductor 424 to a node between a first of the capacitors 420 and a first of the ports 422, and the ground 414 is coupled via an inductor 426 to a node between the second of the capacitors 420 and the second of the ports 422. Each sub-interface 402 further includes a pair of power switches 430, one for each leg of the associated two-wire link 220. For example, a first power switch 430-1a is coupled downstream of the node connecting to the inductor 424, and a second power switch 430-1b is coupled downstream of the node connecting to the inductor 426. The power switches 430 may be generically referred to as the power switches 430, and individually referred to as 430-1a, 430-1b, 430-2a, 430-2b, . . . through 430-na, 430-nb. Each power switch 430 may be, for example, a transistor (e.g., a field effect transistor (FET), a metal-oxide-semiconductor field effect transistor (MOSFET), bipolar transistor (BJT), a relay, or the like). The description of the sub-interface 402 associated with two-wire link 220-1 similarly applies to the other sub-interfaces 402.

In some examples, the switch control signals 320 (also labeled SW1-n) may include a plurality of control signals, one for each power switch 430. Each control signal may be provided (e.g., along a conductive path) to a control gate of the associated power switch 430. For example, as illustrated, the switch control signals 320 may include a first switch control signal SW1a (to control the power switch 430-1a), a second switch control signal SW1b (to control the power switch 430-1b), a third switch control signal SW2a (to control the power switch 430-2a), a fourth switch control signal SW2b (to control the power switch 430-2b), and so on through control signals SWna and SWnb. In some examples, the switch control signals 320 includes shared control signals that are provided to more than one power switch 430. For example, a single shared control signal may be provided to the control gate of each of the power switches 430 to provide control thereof in parallel, such that the microcontroller 300 (of FIG. 3) can generate a single all-on or all-off control signal to selectively enable all power switches 430 and disable all power switches 430 in parallel. In other embodiments, one or more shared control signals of the switch control signals 320 may be provided to a subset of the power switches (i.e., fewer than all of the power switches 430). Regardless, each power switch 430 may receive a control signal from the switch control signals 320, whether shared among one or more other power switches 430 or unique to that particular power switch 430.

FIG. 4 also illustrates the two-wire links 220 in further detail. For example, as illustrated, the two-wire link 220-1 includes a twisted pair of wires 440, with a first wire of the twisted pair coupled to the first port 422 and to a first port 442 of the field device 116-1 and a second wire of the twisted pair coupled to the second port 422 and to a second port 444 of the field device 116-1. Additionally, the twisted pair of wires 440 extends through a shielding 450. The shielding 450 may be a conduit defining a tubular volume within which the twisted pair of wires 440 resides. The shielding 450 may include a conductive layer and may be coupled to a port 452 of the APL interface 214, which may be grounded. The shielding 450 may protect the twisted pair of wires 440 from interference that may disrupt communications along the two-wire link 220. The description of the two-wire link 220-1 similarly applies to the other two-wire links 220 (e.g., two-wire link 220-2 through 220-n).

Although the power switches 430 are illustrated as being within the APL interface 214 in FIG. 4, in some other examples, the power switches 430 are external to the APL routing device 102. For example, the power switches 430 may be positioned at another location along the respective two-wire links 220 that is external to a housing of the APL routing device 102 and between the APL routing device 102 and the associated field device 116. The switch control signals 320 that are configured to control each respective power switch 430 may be provided along a cable or other communicative connection to the particular power switch 430. For example, as described below with respect to FIG. 6, the power switches 430 may be external to the APL routing device 102 and part of a backplane that retains the APL routing device 102. In other examples, the power switches 430 may be further downstream along the two-wire link 220 and, accordingly, not part of the backplane. In some examples, some of the power switches 430 are internal to the APL routing device 102 and some of the power switches 430 are external to the APL routing device 102.

Figure 5:
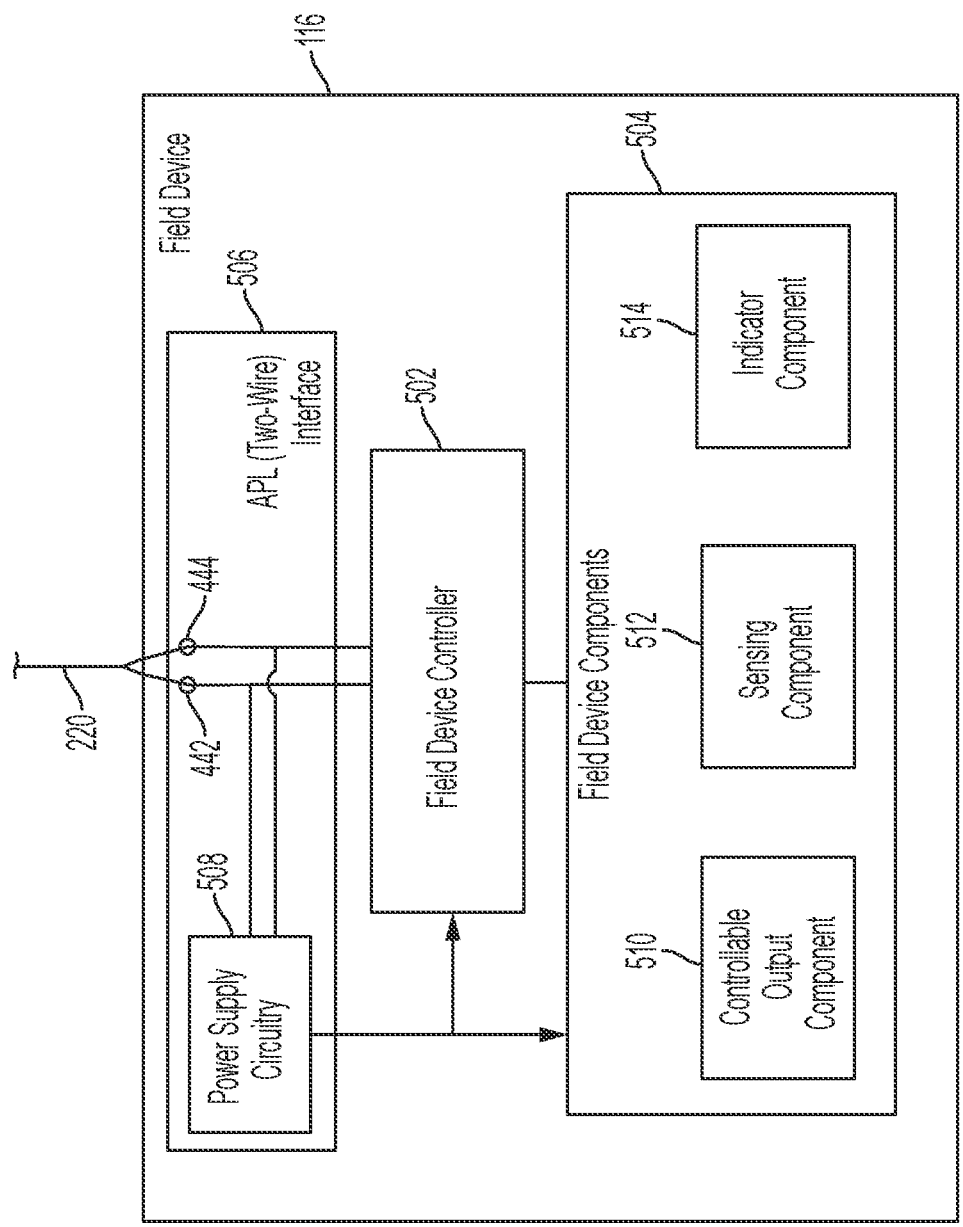
FIG. 5 is a diagram of a field device in accordance with an aspect of this disclosure.

FIG. 5 illustrates an example of one of the field devices 116, such as the field device 116-1, of FIGS. 1, 2, and 4. As described above, each field device 116 is configured to receive power and communications from the APL routing device 102 over a respective one of the two-wire links 220. Each field device 116 may include a field device controller 502, one or more field device components 504, and a field device APL interface 506. The field device APL interface 506 may include the ports 442 and 444, power supply circuitry 508, and connections from the ports 442 and 444 to the field device controller 502 and to the power supply circuitry 508. The field device components 504 may include one or more controllable output components 510 (e.g., a digital valve controller, a variable frequency drive, a solenoid, etc.), one or more sensing components 512 (e.g., a pressure sensor, temperature sensor, flow rate sensor, current sensor, voltage sensor, etc., and/or one or more indicating components 514 (e.g., a speaker, light, LED display, etc.). The power supply circuitry 508 may receive, condition, and supply power received via the two-wire link 220 to the other components of the field device 116, such as the field device controller 502 and the one or more field device components 504.

The field device controller 502 may include an electronic processor and a memory. The memory may store instructions that the electronic processor retrieves and executes to implement the functionality of the field device controller 502 described herein. The electronic processor can include one or more processors, field programmable gate arrays (FPGAs), application specific integrated circuits (ASICs), or other processing circuitry operating alone or in combination with one another to implement the functionality of the field device controller 502 described herein. For example, the field device controller 502 may receive and process communications transmitted over the two-wire link 220 (e.g., originating from the APL routing device 102, network controller 201, or another controller of the control system 100). To process the communications, the field device controller 502 may recognize that the communication is intended for the field device based on a field device identifier in the communication (e.g., an address in a header of the communication associated with the field device). In response to determining that the communication is intended for the field device 116, the field device controller 502 may interpret and carry out commands or respond to requests indicated in the payload of the communication. For example, the command may request information from a sensor of the sensing components 512, in which case the field device controller 502 may respond to the requesting device with the requested sensor information; the command may request that the field device control a controllable output component 510 (e.g., a valve) to open or close a particular amount or to a particular setpoint, in which case the field device controller 502 may react by controlling the controllable element as commanded; the command may request that the field device control an indicator component 514 (e.g., a light) to illuminate, in which case the field device controller 502 may react by controlling the indicator component 514 to illuminate as commanded; among many other potential commands. In some examples, the command may be a safe state command that requests that the field device 116 enter a safe state. In response, the field device controller 502 may control one or more of the field device components 504 to enter the safe state (e.g., a valve may be controlled to be fully opened or fully closed, as appropriate, a motor may be controlled to be off, etc.). The safe state matches a de-energized state of the field device. For example, when the field device 116 is a control valve that is controlled via a digital valve controller (DVC), the valve may enter the safe state (e.g., closed) either because (1) the DVC is commanded to cause the valve to close and successfully accomplishes valve closure in accordance with the normal operation of the DVC, or (2) power is removed from the DVC and the mechanical configuration of the control valve (e.g., valve actuator includes a spring to drive the valve to the closed position) causes the control valve to enter the closed, safe state.

Additionally, the field device controller 502 may generate communications and transmit the communications over the two-wire link 220 (e.g., via the field device APL interface 506 and in accordance with the APL protocol). The field device controller 502 may generate and transmit these communications in response to a request (e.g., a request for sensor information), based on programming of the field device controller 502 to periodically transmit sensor information or status information of the field device, or based on programming of the field device controller 502 defining conditions or triggers to cause the field device controller to generate and transmit the communications. For sending and receiving communications over the two-wire link 220, the field device controller 502 may include or implement a physical layer interface similar to the APL physical interface 310.

Figure 6:
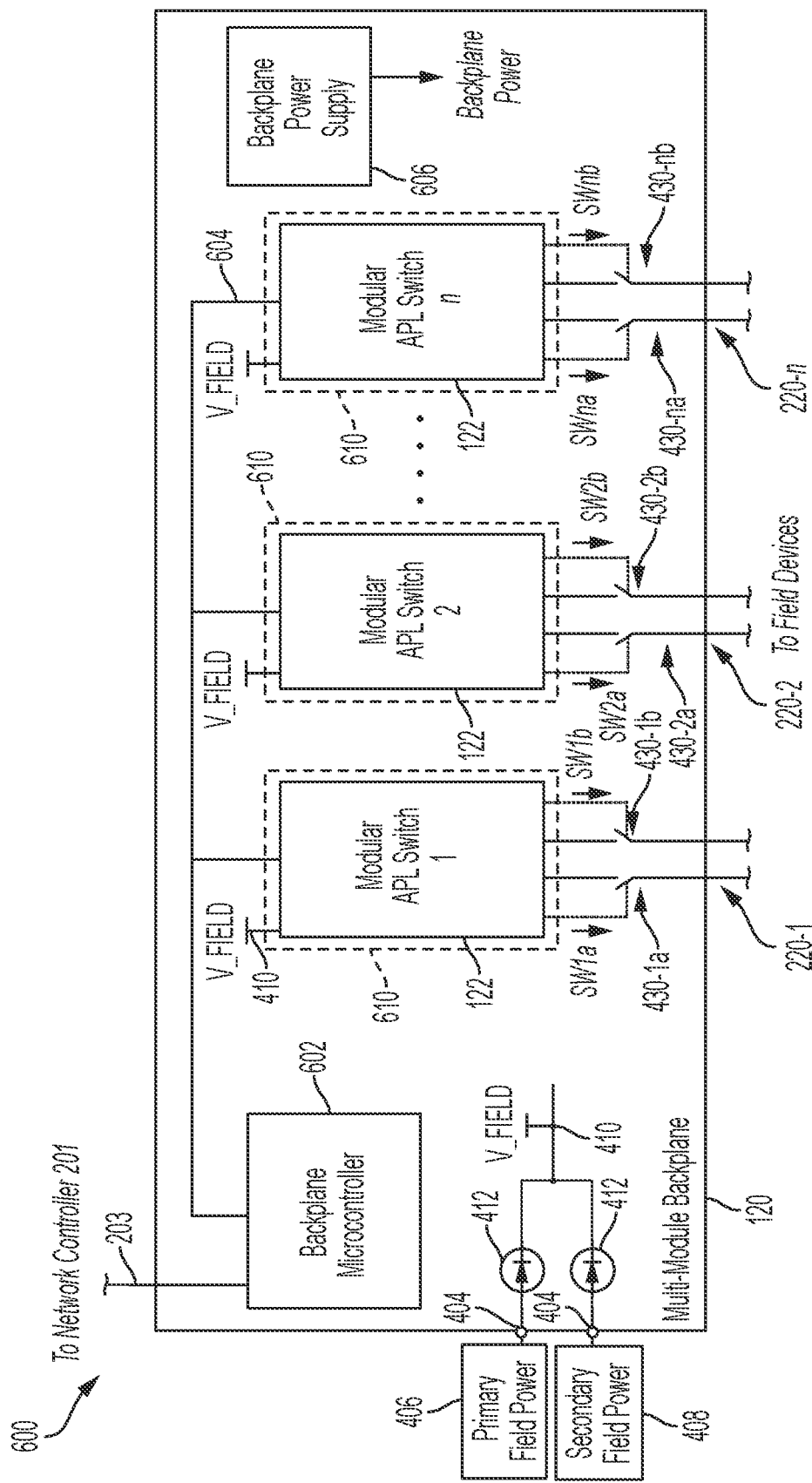
FIG. 6 is a diagram of a backplane including an APL routing device in accordance with an aspect of this disclosure.

FIG. 6 illustrates a diagram 600 of an example of the backplane 120 of FIG. 1 in further detail. The backplane 120 includes a backplane microcontroller 602, a communication bus 604, a backplane power supply 606, and a plurality of module bays 610. Each of the module bays 610 is configured to receive a field device characterization module, such as the modular APL switches 122. The communication bus 604 provides a communicative link between the backplane microcontroller 602 and the devices within the module bays 610 (e.g., the modular APL switches 122). The backplane microcontroller 602 is an intermediary device (e.g., an example of the intermediary devices 204 of FIG. 2) provided between the modular APL switches 122 and the network controller 201 and/or other network controllers. The backplane microcontroller 602 may perform routing functions, similar to network switch 304, to route communications from upstream devices (e.g., the network controller 201 and/or other controllers) to the modular APL switches 122 and/or field devices 116, and to route communications from the modular APL switches 122 and/or field devices 116 to upstream devices. The backplane microcontroller 602 may also be configured to identify a field device characterization module upon insertion into a module bay of the module bays 610, confirm compatibility of the inserted module with the backplane 120, and then control the backplane power supply 606 to provide power to the inserted module. Although the module bays 610 are illustrated as each having received a modular APL switch 122, in some examples, one or more of the module bays 610 are empty and/or as having received another (non-APL) field characterization module, such as a module that is coupled via a traditional analog connection to a field device.

Each module bay 610 includes a physical and electrical interface to receive and couple to an associated field device characterization module, such as the modular APL switches 122. For example, with respect to the electrical interface, each module bay 610 may include terminals for connecting the communication bus 604 to the upstream communication interface of the modular APL switches 122 (see, e.g., the upstream communication interface 210 illustrated in FIG. 2); terminals for connecting the modular APL switches 122 to the backplane power supply 606 to receive power (e.g., for powering a router electronic controller 212 of the modular APL switches 122); terminals for connecting the modular APL switches 122 to the power supply node 410; and terminals for connecting the modular APL switches 122 to the power switches 430 and two-wire links 220. With respect to the physical interface, each module bay 610 may include retention elements, such as physical slots, threaded bosses to receive screws, friction fit terminal walls, and the like to selectively retain a module (e.g., the modular APL switch 122) within the module bay 610, but to also permit selective removal of the module (e.g., for replacement).

The backplane 120 further includes a similar two-wire interface power supply as described above with respect to FIG. 4. In particular, the backplane includes connections 404 for coupling to a primary field power 406 and a secondary field power 408. The secondary field power 408 may be a redundant power source providing a backup supply of power in the event of an interruption to the primary field power 406. Both the primary and secondary field powers 406, 408 may provide a DC supply of power to the modular APL switches 122 via the connections 404 for purposes of powering and communicating with the field devices 116. Each connection 404 is coupled to a power supply node 410 via a respective diode 412. Each diode 412 prevents a reverse flow of power (e.g., from the primary field power 406 to the secondary field power 408, and vice versa). Each modular APL switch 122 is coupled to the power supply node 410, which is further coupled to an upstream side of the power switches 430, in a similar manner as shown and described with respect to FIG. 4.

In FIG. 6, the power switches 430 (including power switches 430-1a through 430-nb) are integrated into the backplane 120, external to the modular APL switches 122. For example, the backplane 120 physically supports the power switches 430 and provides electrical connections between the module bays 610 and the power switches 430 to convey the switch control signals 320. Accordingly, each modular APL switch 122 outputs the respective switch control signals SW1a, SW1b, SW2a, SW2b, through SWna and SWnb, also referred to as the switch control signals 320 (see FIGS. 3 and 4), which are received by respective power switches 430. Although the power switches 430 are illustrated in FIG. 6 as part of the backplane 120 and external to the modular APL switches 122, in other examples, the power switches 430 are incorporated into the modular APL switches 122, similar to the power switches 430 illustrated in FIG. 4.

Figure 7:
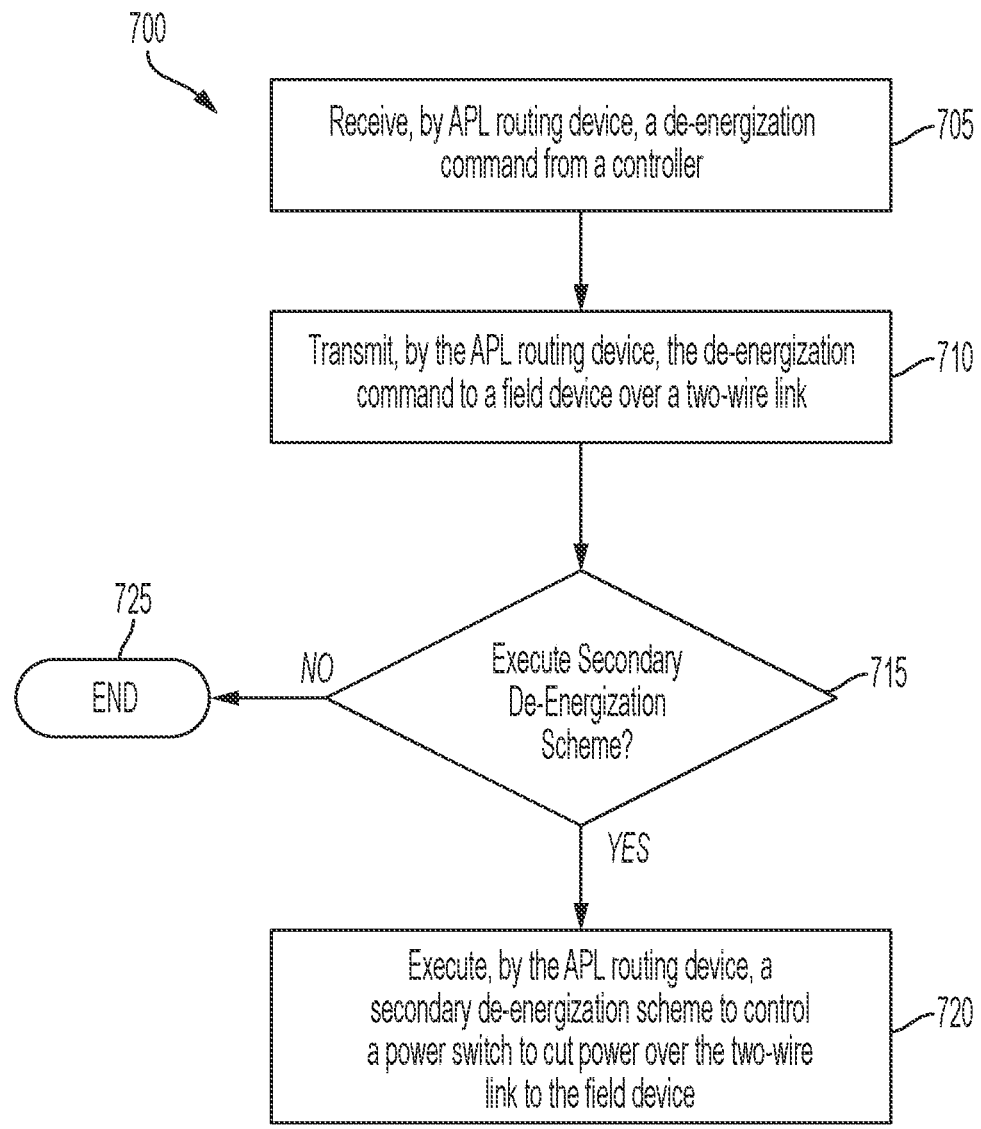
FIG. 7 is a flowchart that illustrates a process for de-energizing a field device in accordance with an aspect of this disclosure.

FIG. 7 illustrates a process 700 for de-energizing a field device. For illustration purposes, the process 700 is generally described as being implemented by the APL routing device 102 of FIGS. 2-4 in the context of the control system 100 of FIG. 1. As described above, the APL routing device 102 may be implemented as, for example, APL switch 124 or as an APL device received in a backplane (e.g., modular APL switch 122 in backplane 120 of FIGS. 1 and 6). In some embodiments, other systems may implement the process 700. Additionally, although the blocks of the process 700 are illustrated in a particular order, in some embodiments, one or more of the blocks can be executed partially or entirely in parallel, can be executed in a different order than illustrated in FIG. 7, or can be bypassed.

In block 705, an advanced physical layer (APL) routing device receives a safe state command from a controller, the safe state command including a field device identifier. For example, with reference to FIG. 2, the APL routing device 102 may receive the safe state command from the network controller 201 over communication bus 203. The APL routing device 102 may receive the safe state command from the network controller 201 directly over the communication bus 203, or via one or more of the intermediary device(s) 204. For example, with reference to FIG. 6, the APL routing device 102 (implemented as the APL switch 124) may receive the safe state command via the backplane microcontroller 602. The upstream communication interface 210 of the APL routing device 102 may receive the safe state command and provide the safe state command to the router electronic controller 212. Ultimately, as described further below, the safe state command is a command for a field device 116 (a field device identified by the field device identifier) to enter a particular safe state. The safe state command may be a packetized communication in a first protocol (e.g., an Ethernet protocol such as defined by IEEE 802.3 or 802.11), the packetized communication including the safe state command as one or more data payload packets and a packet header including an address of the field device that is being commanded to the safe state as the field device identifier.

The network controller 201 may generate the safe state command that is received in block 705 based on one or more factors. For example, the network controller 201 112 may generate the safe state command in response to determining the presence of a safety condition in the control system 100, as previously described. For example, the network controller 201 may analyze system data for the control system 100 (e.g., provided by one or more input field devices 116) to determine whether a safety condition is present. To analyze the system data, the network controller 201 may compare parameters indicated by the system data to one or more thresholds defining operation ranges for the respective parameters. When the network controller 201 determines that a parameter or parameters is/are outside of the defined operation ranges, the network controller 201 may determine a safety condition is present. The network controller 201 may also determine a safety condition is present based on receipt of a direct or binary indication from another device in the control system 100 that the safety condition is present.

In block 710, the APL routing device (e.g., APL routing device 102) transmits the safe state command to a field device (e.g., one of the field devices 116) indicated by the field device identifier as a digital signal via a two-wire communication and power interface over a two-wire link that also provides power to the field device. For example, as part of implementing block 710, with reference to FIG. 3, the router electronic controller 212 may process the safe state command received in block 705. To process the safe state command, the router electronic controller 212 (e.g., via the network switch 304) may parse the command to identify, from a header of the command, an intended recipient. More particularly, the network switch 304 may determine the field device identifier from the header, which indicates the intended recipient of the safe state command. For purposes of this explanation, in this example, the field device identifier can be considered to indicate field device 116-1 of the field devices 116. The network switch 304 may then transmit the safe state command to the APL physical interface 310 associated with the identified field device (e.g., to the APL physical interface 310 associated with field device 116-1) over the corresponding bus 312. For example, the network switch 304 may retain a mapping, e.g., in a memory of the network switch 304, of field device identifiers of the field devices 116 to corresponding APL physical interfaces 310. Thus, the network switch 304 may compare a determined field device identifier extracted from a received communication (e.g., the safe state command) to the mapping to identify which of the APL physical interfaces 310 to which the network switch 304 should transmit the received communication.

The APL physical interface 310 that receives the safe state command then translates the safe state command to a two-wire communication (e.g., in accordance with the APL communication protocol) and outputs the translated safe state command along internal connectors 314 to the APL interface 214. Through outputting the translated safe state command to the APL interface 214, the router electronic controller 212 drives the APL interface 214 to convey the safe state command to the field device 116-1. More particularly, with reference to FIG. 4, the sub-interface 402 associated with field device 116-1 transmits the safe state command over the communication link 220-1 to the field device 116-1. At the time of transmission, the power switches 430-1a and 430-1b may be enabled (e.g., closed based on the control signals SW1a and SW1b of the switch control signals 320 from microcontroller 300) to permit the transmission of the safe state command and power over the communication link 220-1 to the field device 116-1.

In block 715, the APL routing device (e.g., the APL routing device 102) may determine whether to execute a secondary de-energization scheme. When the APL routing device determines to execute a secondary de-energization scheme, the APL routing device proceeds to block 720. When the APL routing device 102 does not determine to execute a secondary de-energization scheme (e.g., after a certain time period elapses or based on a communication from the network controller 201 that the secondary de-energization scheme is not desired), the process 700 may end at block 725. The APL routing device 102 may determine to execute a secondary de-energization scheme in response to receiving a command to execute the secondary de-energization scheme (a secondary de-energization command) from the network controller 201. The secondary de-energization command may be addressed, by the network controller 201, to the APL routing device 102. For example, the secondary de-energization command may include an address of the APL routing device 102 in a header of the command, where the address indicates that the APL routing device 102 is the intended recipient of the command and that the command is intended for the APL routing device 102 to execute. Additionally, the secondary de-energization command may include an identifier for the field device 116 to be de-energized using the secondary de-energization scheme (e.g., the field device 116-1 previously indicated in the safe state command received in block 705).

The network controller 201 may send the secondary de-energization command to the APL routing device 102 for one or more reasons. For example, the network controller 201 may send the secondary de-energization command in response to an inability of the network controller 201 to determine or confirm that the safe state command was effective. For example, the network controller 201 may be unable to confirm that the safe state command was effective when the network controller 201 affirmatively determines that the field device 116 did not enter the safe state and/or when the network controller 201 is not able to confirm whether the field device 116 entered the safe state. The network controller 201 may determine that the safe state command was ineffective (i.e., that the field device 116 did not enter the safe state) based on one or more of: (1) a communication from the field device 116-1 indicating that the field device 116-1 is not in the safe state, (2) sensing one or more parameters from another field device 116 (or field devices 116) that are indicative of the field device 116-1 having not entered the safe state (e.g., a lack of change or a particular change in fluid pressure, flow rate, temperature, etc.), among other techniques to determine that the safe state command was ineffective.

Conversely, the network controller 201 may determine not to send the secondary de-energization command in response to confirming that the safe state command was effective. The network controller 201 may determine that the safe state command was effective for a particular field device 116 (e.g., field device 116-1) based on one or more of: (1) an acknowledgment from the field device 116-1 that the field device 116-1 received the safe state command, (2) a confirmation message from the field device 116-1 that the field device 116-1 has entered the safe state, (3) sensing one or more parameters from another field device 116 (or field devices 116) that are indicative of the field device 116-1 having entered the safe state (e.g., a loss of fluid pressure below a threshold, an increase in a fluid pressure above a threshold, a change in a flow rate of a fluid beyond a threshold, a change in temperature or absolute temperature beyond a threshold, among many other possible parameter-based indications), among other techniques to determine that the safe state command was effective.

In some examples, the network controller 201 may send the secondary de-energization command to the APL routing device 102 without regard to whether the safe state command was effective. For example, in response to detecting a network storm or a request for shutdown of the control system 100 or the particular field device 116, the network controller 201 may transmit both the safe state command addressed to the field device 116 and secondary de-energization command addressed to the APL routing device 102 (and indicating the field device 116 for de-energization). In other words, the secondary de-energization command may be sent as a redundant communication by the network controller 201 to ensure that the field device 116 is de-energized, whether based on the safe state command or secondary de-energization command.

In some examples, the network controller 201 may send the secondary de-energization command to the APL routing device 102 in response to a determination that the network controller 201 has lost communication with the field device 116 for more than a predetermined amount of time. To make this determination, the network controller 201 may maintain a watchdog timer that is refreshed periodically by the network controller 201 in response to receipt of respective periodic communications from the field device 116. When the watchdog timer elapses, because a communication from the field device 116 was not received in time to refresh the watchdog timer, the network controller 201 determines that communication with the field device 116 has been lost for the predetermined amount of time. In response, the network controller 201 transmits the secondary de-energization command to the APL routing device 102 and, with the command, identifies the field device 116 to be de-energized.

In some examples, the APL routing device 102 determines to execute the secondary de-energization scheme based on (i) determining that the network controller 201 commanded the field device 116 to the safe state and (ii) that the command of the field device 116 to the safe state was ineffective. For example, in some examples, the APL routing device 102 "sniffs" communications from the network controller 201 to the field device 116. In such examples, the APL routing device 102 may determine that the network controller 201 is commanding the field device 116 to a safe state by sniffing (detecting) a communication addressed to the field device 116 that includes the safe state command received in block 705. Then, the APL routing device 102 may detect that the field device 116 has not been entered the safe state based on receipt of a further communication from the field device 116 or another technique, such as one of the techniques described with respect to the network controller 201 detecting whether a safe state command was effective. When the APL routing device 102 detects that the field device 116 has not entered the safe state despite the detected attempt by the network controller 201 to command the field device 116 to the safe state, the APL routing device 102 may determine to execute a secondary de-energization scheme (e.g., and proceed to block 720 of the process 700). In other examples, the communications between the network controller 201 and the field devices 116 are encrypted or otherwise opaque to the APL routing device 102, and the APL routing device 102 is unable to sniff a safe state command addressed to one of the field devices 116. In such examples, the APL routing device 102 determines whether to execute a secondary de-energization scheme based on one of the other described techniques.

In block 720, the APL routing device (e.g., the APL routing device 102) executes a secondary de-energization scheme for the field device (e.g., the field device 116-1) subsequent to transmitting the safe state command to the field device. The secondary de-energization scheme includes controlling, by the APL routing device, a power switch to cut power over the two-wire link to the field device. For example, with reference to FIGS. 3 and 4, the APL routing device 102 (e.g., the router electronic controller 212 and, more particularly, the microcontroller 300) may generate one or more of the switch control signals 320. The one or more switch control signals 320 may include control signals for the power switches 430 corresponding to the two-wire link 220-1 and the field device 116-1 (i.e., control signals SW1a and SW1b for the power switches 430-1a and 430-1b, respectively). The one or more switch control signals 320 are configured to control the power switches 430-1a and 430-1b associated with the two-wire link 220-1 and the field device 116-1 to open, thereby cutting or ceasing power from the power supply node 410 and ground 414 to the field device 116-1 via the two-wire link 220-1. With reference to FIG. 6, in the example of the APL routing device 102 being implemented as the modular APL switches 122 in a backplane 120, similarly, the power switches 430-1a and 430-1b are controlled by the switch control signals SW1a and SW1b to open to cut power via two-wire link 220-1 to the field device 116-1.

In some examples, the APL routing device 102 may implement a modified process 700 including block 715 and block 720, and where blocks 705 and 710 are not present, or are present but optional. For example, the APL routing device 102 may execute a secondary de-energization scheme based on a watchdog timer maintained by the APL routing device 102 that elapses, indicating a loss of a communication link between the APL routing device 102 and the network controller 201. In such examples, the APL routing device 102 may implement a modified process 700 including block 715 (where the APL routing device 102 determines to implement the secondary de-energization scheme in response to the watchdog timer elapsing) and block 720 (where the APL routing device 102 executes the secondary de-energization scheme to de-energize the field device 116), and where blocks 705 and 710 are not present, or are present but optional. More particularly, the microcontroller 300 may also be configured to perform a watchdog timer function in which the microcontroller 300 periodically confirms the presence of a communication link with the network controller 201. For example, the microcontroller 300 may implement a countdown timer (as the watchdog timer) that the microcontroller 300 resets upon receipt of a watchdog timer communication from the network controller 201. The network controller 201 is configured to periodically send a watchdog timer communication to repeatedly reset the countdown timer and prevent the countdown timer from elapsing (e.g., reaching zero). When the microcontroller 300 determines that the countdown timer has elapsed, the microcontroller 300 determines that a communication link with the network controller 201 is broken or not present (e.g., because of an interruption in the communication bus 203, a fault on the network controller 201, or the like). In response, the microcontroller 300 may then, in block 715 of the process 700, determine to execute the secondary de-energization scheme to de-energize one or more of the field devices 116. In block 720, in response to the determination, the microcontroller 300 may then execute the secondary de-energization scheme to de-energize one or more of the field devices 116 by controlling the associated one or more power switches 430 to cut power over the two-wire links 220 to the field device(s) 116.

In some examples, in response to determining to execute the secondary de-energization scheme based on the watchdog timer elapsing, the microcontroller 300 may (i) generate switch control signals 320 to control each power switch 430 to open to cut power to each field device 116 coupled to the APL routing device 102; or (ii) generate switch control signals 320 to control each power switch 430 associated with a field device 116 that is an output field device to open to cut power to each output field device. In the case of the latter example, the microcontroller may leave the power switches 430 for the other, non-output field devices to be unaltered so that the energized non-output field devices may remain energized despite the elapsing of the watchdog timer. These non-output field devices may remain energized because the non-output field devices gather and provide information about the control system 100 (e.g., to the control system 100 and/or users) that may be beneficial to continue receiving, and because they do not directly control system processes. To selectively de-energize output field devices 116 and leave non-output field devices 116 energized, the microcontroller 300 may maintain a mapping or table of each field device 116 coupled to the APL routing device 102 that indicates the type of each field device 116 (e.g., output field device, non-output field device, indicator field device, input field device, etc.). In one example, the mapping may be automatically generated based on the microcontroller 300's knowledge of the type of field device characterization module, such as the type of modular APL switch 122, that is installed in a particular module bay 610. In response to the watchdog timer elapsing and the microcontroller 300 determining to initiate the secondary de-energization scheme, the microcontroller 300 may access the mapping or table to identify which field devices 116 that are coupled to the APL routing device 102 are output field devices, to identify the associated power switch 430 for each such output field device, and then to control the power switches 430 identified as associated with each output field device to be opened (to cut power to each output field device).

In some examples, the APL routing device 102 executes a secondary de-energization scheme based on a watchdog timer maintained by the network controller 201 for one or more field device 116. The watchdog timer of the network controller 201 for each field device 116 may be periodically reset by the network controller 201 based on communications from the field device 116 corresponding to the watchdog timer. These communications from the field device 116 indicate that the field device 116 is still present in the control system 100 and communicatively coupled to the network controller 201 (via the APL routing device 102). If no such communication is received within the set time of the watchdog timer, the watchdog timer elapses, indicating a loss of a communication link between the field device 116 and the network controller 201. In such examples, the network controller 201 may send a secondary de-energization command to the APL routing device 102 that is coupled to the field device 116 that has lost the communication link. The APL routing device 102 may then, in response to the command, execute the secondary de-energization scheme by opening the power switches 430 corresponding to the field device 116. Accordingly, the APL routing device 102 may implement a modified process 700 including block 715 (to determine to execute the secondary de-energization scheme in response to receipt of the secondary de-energization command from the network controller 201 when a watchdog timer elapses) and block 720 (to execute the secondary de-energization scheme to de-energize the field device 116), and where blocks 705 and 710 are not present, or are present but optional.

In some examples, before the process 700 begins (e.g., in an initialization stage) or subsequent to the routing device 102 opening one or more power switches 430 in block 720 to de-energize one or more field devices 116 (e.g., in a resetting stage), the network controller 201 transmits a command to the routing device 102 to close the one or more power switches 430 to energize the one or more field devices 116.

As noted above, although multiple devices are described as APL devices herein (e.g., APL routing devices 102, 122, 124, APL interface 214, APL physical interfaces 310, etc.) and such devices may use Ethernet-APL for communications, in some examples, these devices may implement another two-wire digital protocol that includes power and communication transmission. Accordingly, these devices may also be referred to as two-wire routing devices, two-wire interfaces, two-wire physical interfaces, etc., which may be configured to communicate and transmit or receive power according to Ethernet-APL and/or another two-wire digital protocol that includes power and communication transmission. Similarly, although the process 700 is described with respect to a control system implementing APL communications, this process 700 may also be implemented by such a two-wire routing device (in conjunction with two-wire interfaces) according to another (non-APL) two-wire digital protocol that includes power and communication transmission.

The disclosure is not limited in its application to the details of construction and the arrangement of components set forth in this description or illustrated in the accompanying drawings. The disclosure is capable of other embodiments and of being practiced or of being carried out in various ways. Also, it is to be understood that the phraseology and terminology used herein is for the purpose of description and should not be regarded as limiting. The use of "including," "comprising," "containing," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Some embodiments, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a computer including various computer hardware, software, firmware, and so on, consistent with the discussion below. As specific examples, a control device can include a processor, a microcontroller, a field-programmable gate array, a programmable logic controller, logic gates, etc., and other typical components that are known in the art for implementation of appropriate functionality (e.g., memory, communication systems, power sources, user interfaces and other inputs, etc.). Also, functions performed by multiple components may be consolidated and performed by a single component. Similarly, the functions described herein as being performed by one component may be performed by multiple components in a distributed manner. Additionally, a component described as performing particular functionality may also perform additional functionality not described herein. For example, a device or structure that is "configured" in a certain way is configured in at least that way, but may also be configured in ways that are not listed.

The term "article of manufacture" as used herein is intended to encompass a computer program accessible from any computer-readable device, carrier (e.g., non-transitory signals), or media (e.g., non-transitory media). For example, non-transitory computer-readable media can include but are not limited to magnetic storage devices (e.g., hard disk, floppy disk, magnetic strips, and so on), optical disks (e.g., compact disk ("CD"), digital versatile disk ("DVD'"), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network ("LAN"). Those skilled in the art will recognize that many modifications may be made to these configurations without departing from the scope or spirit of the claimed subject matter.

Certain operations of methods according to the disclosure, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

As used herein, unless otherwise defined or limited, the phase "and/or" used with two or more items is intended to cover or include the items individually and the items together. For example, a device having "a and/or b" is intended to cover or include: a device having a (but not b); a device having b (but not a); and a device having both a and b.

This discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The provided detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

While the invention herein disclosed has been described in terms of specific embodiments and applications thereof, numerous modifications and variations could be made thereto by those skilled in the art without departing from the scope of the invention set forth in the claims.

What is claimed is:

1. A two-wire routing device, the two-wire routing device comprising:
   an upstream communication interface for communication with a controller;
   a two-wire communication and power interface configured to convey communication and power to a field device over a two-wire link; and
   a router electronic controller coupled to the upstream communication interface and the two-wire communication and power interface, the router electronic controller configured to:
      receive, via the upstream communication interface, a safe state command from the controller, the safe state command including a field device identifier;
      transmit, via the two-wire communication and power interface, the safe state command to a field device indicated by the field device identifier as a digital signal over the two-wire link; and
      execute a secondary de-energization scheme for the field device, subsequent to transmitting the safe state command to the field device, to control a power switch to cut power over the two-wire link to the field device.

2. The two-wire routing device of claim 1,
   wherein the router electronic controller includes a network switch, the network switch configured to determine, from the safe state command, the field device identifier to identify the field device indicated by the field device identifier; and wherein, to transmit, by the router electronic controller, the safe state command via the two-wire communication and power interface, the network switch is further configured to:
- translate the safe state command from a first protocol to a two-wire digital protocol; and
- drive the two-wire communication and power interface, according to the two-wire digital protocol, to convey the safe state command to the field device.

3. The two-wire routing device of claim 2, wherein the safe state command received by the upstream communication interface is received by the router electronic controller as a packetized communication in the first protocol, the packetized communication including the safe state command as one or more data payload packets and a packet header including an address as the field device identifier.

4. The two-wire routing device of claim 1, wherein the two-wire routing device is a modular two-wire routing device mounted in a multi-module backplane, the multi-module backplane comprising:
- a plurality of module bays, each module bay configured to receive a respective field device characterization module;
- a backplane microcontroller communicatively coupled to the controller and to each field device characterization module received in the plurality of module bays, and configured to route messages between the controller and each field device characterization module received in the plurality of module bays;
- a communication bus coupling the backplane microcontroller and each module bay to enable communications between the backplane microcontroller and each field device characterization module received in the plurality of module bays; and
- a power supply configured to supply power to each field device characterization module received in the plurality of module bays, wherein the modular two-wire routing device is a field device characterization module that is mounted in a first module bay of the plurality of module bays, is communicatively coupled to the backplane microcontroller, and is powered by the power supply.

5. The two-wire routing device of claim 4, wherein the upstream communication interface is coupled to the backplane microcontroller via the communication bus to enable communication with the backplane microcontroller, and wherein the safe state command received from the controller by the router electronic controller is received via the backplane microcontroller over the communication bus.

6. The two-wire routing device of claim 1, wherein the router electronic controller is further configured to determine to execute the secondary de-energization scheme in response to receipt of a command from the controller to initiate the secondary de-energization scheme, the command being addressed to the two-wire routing device.

7. The two-wire routing device of claim 1, wherein the router electronic controller is further configured to determine to execute the secondary de-energization scheme in response determining that a watchdog timer has elapsed.

8. The two-wire routing device of claim 7, wherein the field device is a first field device of a plurality of field devices coupled to the two-wire routing device, wherein, to execute the secondary de-energization scheme in response to determining that the watchdog timer has elapsed, the router electronic controller is configured to:
- cut power to each output field device of the plurality of field devices, including the first field device, and
- permit power to continue to flow to each non-output field device of the plurality of field devices.

9. The two-wire routing device of claim 1, wherein the field device is a first field device of a plurality of field devices coupled to the two-wire routing device, each field device of the plurality of field devices being coupled to the two-wire communication and power interface via a respective two-wire link and corresponding power switch along the two-wire link, wherein the router electronic controller is further configured to selectively control each corresponding power switch to selectively enable and disable power to plurality of field devices.

10. The two-wire routing device of claim 1, further comprising a housing that houses the router electronic controller and the power switch.

11. The two-wire routing device of claim 1, further comprising a housing that houses the router electronic controller, wherein the power switch is external to the housing.

12. The two-wire routing device of claim 1, wherein the two-wire link includes a twisted pair of conductors extending through a shielding conduit.

13. A method for causing a field device to enter a safe state, the method comprising:
- transmitting, by a two-wire routing device, a safe state command to the field device, based on a field device identifier, as a digital signal via a two-wire communication and power interface over a two-wire link that also provides power to the field device; and
- executing, by the two-wire routing device, a secondary de-energization scheme for the field device subsequent to transmitting the safe state command to the field device, the secondary de-energization scheme including controlling, by the two-wire routing device, a power switch to cut power over the two-wire link to the field device.

14. The method of claim 13, further comprising:
- receiving, by the two-wire routing device, the safe state command from a controller prior to transmitting the safe state command to the field device; and
- identifying, by the two-wire routing device, the field device by extracting the field device identifier from the safe state command;

wherein transmitting, by the two-wire routing device, the safe state command to the field device via the two-wire communication and power interface includes:
- translating the safe state command from a first protocol to a two-wire digital protocol; and
- driving the two-wire communication and power interface, according to the two-wire digital protocol, to convey the safe state command to the field device.

15. The method of claim 14, wherein the safe state command received by the two-wire routing device from the controller is a packetized communication in the first protocol, the packetized communication including the safe state command as one or more data payload packets and a packet header including an address as the field device identifier.

16. The method of claim 14, wherein the two-wire routing device is a modular two-wire routing device mounted in a multi-module backplane, the method further comprising:
- receiving, by each module bay of a plurality of module bays of the multi-module backplane, a respective field device characterization module;
- routing messages, by a backplane microcontroller communicatively coupled to the controller and to each field device characterization module received in the plurality of module bays, between the controller and each field device characterization module received in the plurality of module bays;

conveying, by a communication bus coupling the backplane microcontroller and each module bay, communications between the backplane microcontroller and each field device characterization module received in the plurality of module bays; and supplying power, by a power supply, to each field device characterization module received in the plurality of module bays, wherein the modular two-wire routing device is a first field device characterization module of the field device characterization modules that is mounted in a first module bay of the plurality of module bays, is communicatively coupled to the backplane microcontroller, and is powered by the power supply.

17. The method of claim 16, wherein the two-wire routing device is coupled to the backplane microcontroller via the communication bus to enable communication with the backplane microcontroller, and wherein the safe state command received from the controller by the two-wire routing device is received via the backplane microcontroller over the communication bus.

18. The method of claim 14, wherein executing, by the two-wire routing device, the secondary de-energization scheme for the field device is in response to receipt of a command from the controller to initiate the secondary de-energization scheme, the command being addressed to the two-wire routing device.

19. The method of claim 13, wherein executing, by the two-wire routing device, the secondary de-energization scheme for the field device is in response determining that a watchdog timer has elapsed.

20. The method of claim 19, wherein the field device is a first field device of a plurality of field devices coupled to the two-wire routing device, and wherein executing the secondary de-energization scheme in response to determining that the watchdog timer has elapsed further includes:
cutting power to each output field device of the plurality of field devices, including the first field device, and
permitting power to continue to flow to each non-output field device of the plurality of field devices.

* * * * *